Patented Mar. 29, 1932

1,851,405

UNITED STATES PATENT OFFICE

LUDWIG ROSENSTEIN AND WALTER J. HUND, OF SAN FRANCISCO, CALIFORNIA

ESTERIFICATION PROCESS AND PRODUCT

No Drawing.  Application filed May 2, 1928. Serial No. 274,669.

This invention relates generally to manufacture of condensate products. It relates particularly to the manufacture of certain esters of high molecular weight which are glass-like, non-crystalline solids at ordinary temperatures and have relatively low softening points.

It has previously been known that condensate products are formed by reacting polyhydric alcohols with organic acids at an elevated temperature. Such condensate products are solid and glass like at ordinary temperatures and are chemically known as "esters". Prior processes for the commercial production of such products have been comparatively expensive due in part to the fact that the constituents must be heated for long periods, say from 16 to 22 hours, to secure the desired product. The products from such prior processes have generally been molded under pressure and an elevated temperature to an infusible insoluble form for use as insulating compositions.

While the products resulting from such prior processes may be utilized for certain purposes even tho they are more expensive to produce than certain cheaper condensate products, we have found that they are not applicable for certain purposes. For example we have found that long continuous heating while the constituents are being reacted result in darkening of the final product and furthermore that during such a long heating period there is a marked tendency for the esters to undergo molecular changes which result in the formation of insoluble and infusible forms. For many purposes it is necessary to have a product which is substantially entirely of fusible form. As one element of our invention we have discovered that the time necessary for the desired esterification in producing such products can be greatly shortened by the use of certain catalysts, and we have also found that the use of these catalysts results in a new ester product having certain unique properties making it particularly useful for certain purposes. The object of this invention may be briefly summarized as follows:

It is therefore an object of this invention to materially shorten the time necessary for the manufacture of ester products, thereby making it possible commercially to produce these products at a relatively low cost.

It is a further object of this invention to devise a novel process for the manufacture of esters which will result in a new and superior product particularly useful for certain purposes.

It is a further object of this invention to produce a new composition of matter consisting of an ester having the characteristic properties which make it particularly useful for certain purposes, as for the production of embossed printing.

Further objects of this invention will appear from the following description in which we have set forth the preferred embodiment of our invention. It is to be understood that the appended claims are to be accorded a range of equivalents consistent with the state of the prior art.

We have discovered that certain catalysts are particularly useful for hastening esterification reactions, and that by utilizing a process catalyzed as to be presently explained, it is possible to control the reaction so that an ester product having certain novel properties is obtained. We employ what are known as "surface" catalysts, which are insoluble in the constituents and in the final product. By the use of such catalysts we have reduced the time necessary for complete esterification to from 2 to 4 hours compared to 16 to 22 hours required for the uncatalyzed reaction.

In the preferred method of carrying out the process of our invention, a suitable polybasic carboxylic acid or organic acid anhydrid, such as phthalic anhydrid, is heated to an elevated temperature of say 180 degrees C. The polyhydric alcohol, as for example glycerol is mixed with a small amount of suitable catalyst, such as silica gel, or a material having like essential properties, and this mixture is then mixed with the organic acid anhydrid. The resulting mixture is held at an elevated temperature of say 205 degrees C. for a period sufficient to produce the desired degree of esterification, as for example a period of about two hours. During this time the mixture is constantly agitated and water is removed from the mass by evaporation.

The amount of polyhydric alcohol employed in proportion to the amount of dibasic organic acid, depends somewhat upon the character of the ingredients employed and upon the character of the final product required. In order to produce the best adapted for the purpose of producing embossed printing, we prefer to employ one gram molecular weight of phthalic anhydrid (plus a slight excess), with one gram molecular weight of glycerol. With these proportions about 1.5 grams of finely divided silica gel is sufficient. In reacting an ingredient such as phthalic anhydrid with glycerol, it is well known that water is eliminated. In prior processes for producing esters, it has been customary to employ proportions of ingredients differing from the proportions stated above, and during reacting of these ingredients more than one molecular weight of water was eliminated. Due to this fact, it was impossible to employ certain prior processes for producing esters consisting entirely of the fusible form. However by employing the proportions stated above and by catalyzing the reaction as explained, we can readily arrest the esterification reaction when not more than one molecular weight of water has been eliminated or when a sample of the product shows that substantially the theoretical amount of acid has been esterified, thus making possible a product consisting entirely of the fusible form. Upon cooling the mass resulting from our process controlled as has been explained, a glass like mass is obtained which possesses certain characteristic properties which will be presently specified.

While in the above example of our process, we have referred specifically to glycerol as one ingredient which may be employed, it is to be understood that we may utilize other alcohols such as glycol, or mixtures of these and other polybasic alcohols. Furthermore other acids falling under the group of organic acids, such as polybasic organic acid or acid anhydrid, or mixtures of organic acids, such as succinic acid, can be substituted for or used with phthalic anhydrid. With substances of the class mentioned which react to produce condensate products, we have found that the use of suitable catalyst such as silica gel, will materially reduce the time required for the desired product.

In addition to the silica gel, we have found that other materials can be employed to hasten the time of reaction. For example we have secured good results with diatomaceous earth or other extremely fine and active forms of silica. These catalysts are of the class of surface catalysts, and are insoluble in the reacting constituents, and in the final product. Silica gel in addition to having surface effects of the highest degree is also acidic, which type of catalyst also favors esterification. Of the materials which we have discovered which effect the desired catalytic action, silica gel has given the best results and is therefore the preferred catalyst. We have found that silica gel shortens the time for complete reaction much more than other catalysts, and its presence in the final product is not objectionable.

While we have found the most favorable temperature for esterifying phthalic anhydrid and glycerol to be near 205 degrees C. it is to be understood that when other acids and alcohols or mixtures are esterified by this process, each reaction has its specific optimum temperature and the 205 degree C. point specified for phthalic anhydrid and glycerol is given only as an example for these particular reacting components.

The esters resulting from our process possess certain characteristic properties distinguishing them from esters produced by prior processes. For example the preferred product resulting from the catalyzed reaction of glycerol and phthalic anhydrid, known as glyceryl-phthalate, produced by the process explained above, is comparatively clear or transparent and is light in color compared to prior products of its kind. Furthermore it is entirely of fusible form and is readily soluble in certain substances. It is glass-like, and has a flow point below 100 degrees C. By utilizing the proper quality and quantity of ingredients and by properly controlling the process, the product will be substantially free of alcohol. The clear color of the product and the almost total absence of the infusible insoluble form of ester is attributed to the fact that in our process the heat treatment is for a relatively short period as compared to the long heat treatment required by prior processes.

Because of the relatively short period of heating, the final product is substantially free of esters of the infusible and insoluble form. Furthermore as has been previously explained, our process is carried out in such a manner that the final product is produced by utilizing certain proportions of polyhydric alcohol and dibasic organic acid reacted in such a manner that not more than one molecular weight of water is eliminated by reaction. Thus our preferred product contains a polyhydric alcohol radical and a dibasic organic acid radical in proportions of one molecular weight of the former to one molecular weight of the latter.

In practice it is apparent that the final product of our process may either be used alone or may be mixed or blended with other substances. These other substances may be employed for suppressing, supplementing or augmenting certain properties of the natural product. For example its flow point may be substantially reduced by blending the products of our process with elemi resin.

One use for the product of our invention, particularly glyceryl-phthalate produced as specified above, is for furnishing a material suitable for use in "process embossing" or for the production of raised printing. As is well known, in producing raised printing a fusible powder is applied to a freshly inked surface. After excess powder is removed the printed sheet is passed thru an oven where the powder is fused. We have found that our product may be powdered and successfully used as an ingredient in such printing processes, either alone or blended with other substances such as elemi resin. It has certain properties making it particularly desirable for this purpose, namely its tenacity and durability, its definite flow point below 100 degrees C., and the fact that it is of relatively clean color or practically colorless. For this particular use we have found that esters produced by former processes cannot be as efficiently employed principally because of their relatively dark color and infusibility or high flow point temperature.

In addition to the principal use referred to above, the products of this invention may be used with advantage for many other purposes. For example certain of the esters so produced are desirable substitutes for shellac and other natural gums and plasticizers used in paints and varnish. They may be dissolved in many well known solvents, such as diethylphthalate or acetone. Being readily fusible such esters may form the base for many compositions, which may be molded and pressed to any desired form, and which may be transformed into the infusible form by heating under pressure. They may also form a satisfactory base for the production of insulating materials which may be molded or may be applied as a coating to wire and other electrical parts and then transformed by heat into infusible forms.

We claim:

1. In a process of producing esters by reacting a polyhydric alcohol with a polybasic carboxylic acid substantially in the liquid phase, the step of utilizing silica gel as a catalyst.

2. In a process of producing esters, the step of reacting substantially in the liquid phase a polyhydric alcohol with a polybasic carboxylic acid under the influence of heat in contact with finely divided silica gel.

3. In a process of producing esters, the step of reacting substantially in the liquid phase phthalic anhydrid with glycerol at a temperature of substantially 205° C. and in contact with silica gel.

4. As a new composition of matter the esterification product of a polyhydric alcohol and a polybasic carboxylic acid produced by substantially a liquid phase reaction between said alcohol and said acid catalyzed by silica gel.

5. In a process of producing esters, the step of reacting substantially in the liquid phase a polyhydric alcohol and a polybasic carboxylic acid under the influence of heat in the presence of silica gel.

6. In a process of producing an ester by reaction between a polyhydric alcohol and a polybasic carboxylic acid, the ester being unstable in the vapor phase, the step of reacting the alcohol and the acid in the liquid phase under the influence of heat and in the presence of silica gel to produce a liquid phase stable ester.

In testimony whereof we have hereunto set our hands.

LUDWIG ROSENSTEIN.
WALTER J. HUND.